US009147308B2

(12) United States Patent
Joung

(10) Patent No.: US 9,147,308 B2
(45) Date of Patent: Sep. 29, 2015

(54) METHOD OF GAMING, A GAME CONTROLLER AND A GAMING SYSTEM

(75) Inventor: Sek Hwan Joung, Lakemba (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/543,186

(22) Filed: Jul. 6, 2012

(65) Prior Publication Data

US 2012/0270658 A1 Oct. 25, 2012

Related U.S. Application Data

(63) Continuation of application No. 12/613,074, filed on Nov. 5, 2009, now Pat. No. 8,317,595.

(30) Foreign Application Priority Data

Nov. 5, 2008 (AU) ................................ 2008905727

(51) Int. Cl.
*A63F 13/06* (2006.01)
*G07F 17/32* (2006.01)

(52) U.S. Cl.
CPC ............ *G07F 17/32* (2013.01); *G07F 17/3244* (2013.01)

(58) Field of Classification Search
USPC ............................................................ 463/37
See application file for complete search history.

(56) References Cited

U.S. PATENT DOCUMENTS

| | | | | |
|---|---|---|---|---|
| 7,235,011 | B2 | 6/2007 | Randall et al. | |
| 2005/0075163 | A1 | 4/2005 | Cuddy et al. | |
| 2009/0082099 | A1 * | 3/2009 | Luciano et al. | 463/26 |
| 2009/0093300 | A1 | 4/2009 | Lutnick et al. | |
| 2009/0233702 | A1 | 9/2009 | Bramble | |
| 2010/0099491 | A1 | 4/2010 | Little et al. | |
| 2010/0124983 | A1 | 5/2010 | Gowin et al. | |
| 2010/0160037 | A1 | 6/2010 | Pau | |
| 2011/0065490 | A1 | 3/2011 | Lutnick | |
| 2011/0244943 | A1 | 10/2011 | Milford et al. | |
| 2012/0058814 | A1 | 3/2012 | Lutnick et al. | |
| 2012/0064967 | A1 | 3/2012 | Preisach | |
| 2012/0135796 | A1 * | 5/2012 | Plowman | 463/20 |

FOREIGN PATENT DOCUMENTS

| | | | |
|---|---|---|---|
| AU | 776584 | | 4/2002 |
| AU | 2002300126 | B2 | 6/2003 |
| WO | 2007082336 | A1 | 7/2007 |

* cited by examiner

*Primary Examiner* — Pierre E Elisca
(74) *Attorney, Agent, or Firm* — McAndrews, Held & Malloy, Ltd.

(57) ABSTRACT

In one example, there is provided a method of gaming comprising initiating play, conducting a feature game in response to a feature trigger condition being met, providing at least two alternative continuations which may be accessed if a further trigger condition is met during the feature game, determining which of the alternative continuations to apply upon the further trigger condition being met, and continuing play with the determined continuation.

3 Claims, 6 Drawing Sheets

METHOD OF GAMING, A GAME CONTROLLER AND A GAMING SYSTEM

RELATED APPLICATIONS

This application is a continuation of U.S. patent application Ser. No. 12/613,074, filed Nov. 5, 2009 which claims priority to Australian Provisional Patent Application No. 2008905727, filed Nov. 5, 2008, and is incorporated herein in its entirety.

FIELD

The invention relates to a method of gaming, a game controller and a gaming system.

BACKGROUND OF THE INVENTION

Many existing gaming machines incorporate a feature game into the game or games playable with the gaming machine. A feature game generally involves some additional game play before the player is required to make another wager, for example a series of free games in a spinning reel type game. Such feature games are awarded when a trigger condition is met. For example, when a particular symbol combination appears in a spinning reel type game.

While such gaming machines provide users with enjoyment, a need exists for alternative gaming systems in order to maintain or increase player enjoyment.

BRIEF SUMMARY OF THE INVENTION

In a first aspect, the invention provides a method of gaming comprising:

initiating play;

conducting a feature game in response to a feature trigger condition being met;

providing at least two alternative continuations which may be accessed if a further trigger condition is met during the feature game;

determining which of the alternative continuations to apply upon the further trigger condition being met; and continuing play with the determined continuation.

In an embodiment, there are a plurality of variants of at least one of the continuations related to variants of the further trigger.

In an embodiment, the further trigger comprises a plurality of a designated symbol being displayed in the feature game and the variants of the further trigger are the number of designated symbols displayed, and wherein the variants in the at least one continuation are that different numbers of additional game events are awarded based on the number of designated symbols that are in the further trigger.

In an embodiment, the further trigger condition is the same as the feature trigger condition.

In an embodiment, the method comprises offering a selection of the at least two alternative continuations to a player, receiving a player selection of a continuation, and determining the received player selection to be the continuation to apply.

In an embodiment, the method comprises providing information to the player to assist the player to determine an optimal selection based on the current state of the feature game.

In an embodiment, determining of a continuation to apply is performed by a game controller selecting the continuation based on at least one game rule.

In an embodiment, the game rule is to select an optimal selection based on the current state of the feature game.

In an embodiment, one continuation of the feature game is to end the current feature game and start a new feature game.

In an embodiment, one continuation of the feature game is to add a number of game events to the current number of game events available in the feature game.

In an embodiment, the game events are free games of a spinning reel type game.

In an embodiment, the game events are re-spins of a subset of the reels in a spinning reel type game.

In an embodiment, one continuation of the feature game is to apply a modifier to the feature game.

In an embodiment, the modifier is a multiplier of any awards made in the feature game.

In an embodiment, a counter is incremented to trigger a feature and one continuation is to increment the counter.

In a second aspect, the invention provides a game controller for a gaming system, the game controller arranged to:

initiate play;

conduct a feature game in response to a feature trigger condition being met;

provide at least two alternative continuations which may be accessed if a further trigger condition is met during the feature game;

determine which of the alternative continuations to apply upon the further trigger condition being met; and continue play with the determined continuation.

In an embodiment, a continuation module arranged to determine which alternative to apply.

In an embodiment, the continuation module is adapted to receives a player selection of a continuation, and determines the received player selection to be the continuation to apply.

In an embodiment, the continuation module is adapted to select the continuation based on at least one game rule.

In an embodiment, the continuation module is adapted to evaluate the current state of the feature game and make an optimal selection of a continuation based on the current state of the feature game.

In an embodiment, the game controller is constituted by a processor executing program code stored in a memory.

In a third aspect, the invention provides a gaming system comprising:

a display for displaying game play to a player; and a game controller arranged to:

initiate play;

conduct a feature game in response to a feature trigger condition being met;

provide at least two alternative continuations which may be accessed if a further trigger condition is met during the feature game;

determine which of the alternative continuations to apply upon the further trigger condition being met; and continue play with the determined continuation.

In an embodiment, game play mechanism operable by a player to make a selection of one of the alternative continuations and wherein the game controller is arranged to determine the selected continuation as the continuation to apply.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
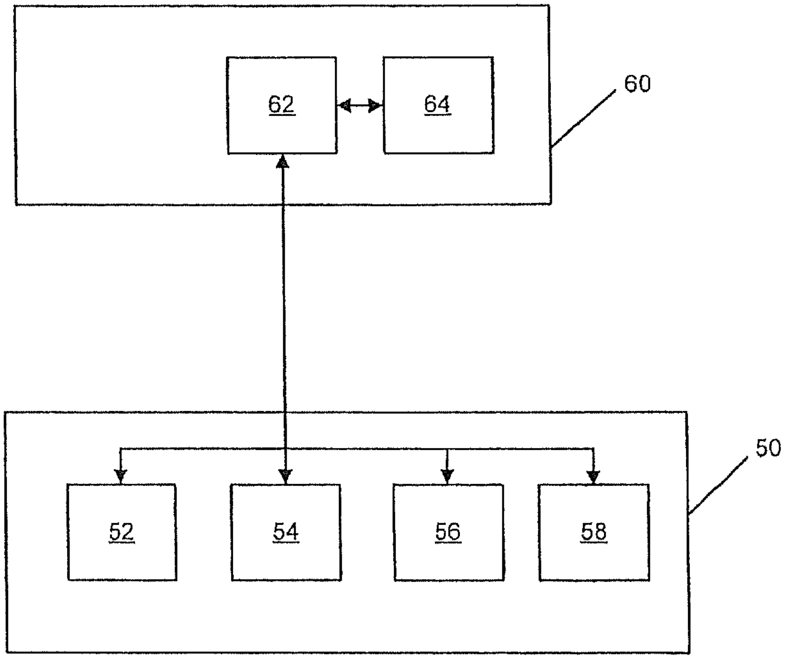
FIG. 1 is a block diagram of the core components of a gaming system.

Referring to the drawings, there is shown a gaming system having a game controller arranged to implement a game where during a feature game a further trigger condition may occur. A number of possible continuations can be accessed from the feature game, one of which is determined upon the further trigger condition occurring. Depending upon the embodiment, the continuation may be selected by the player or the game controller. Exemplary continuations include providing additional game events such as free games or ending the feature game and restarting it.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
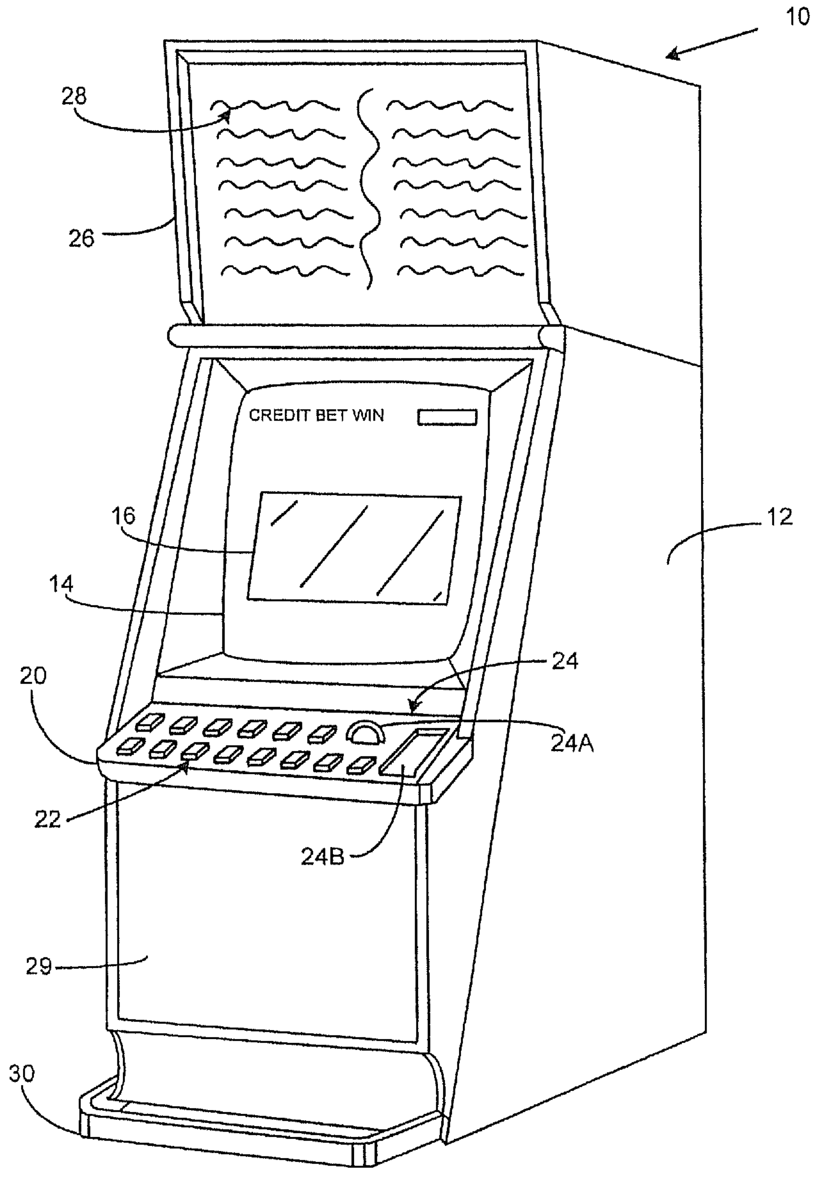
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
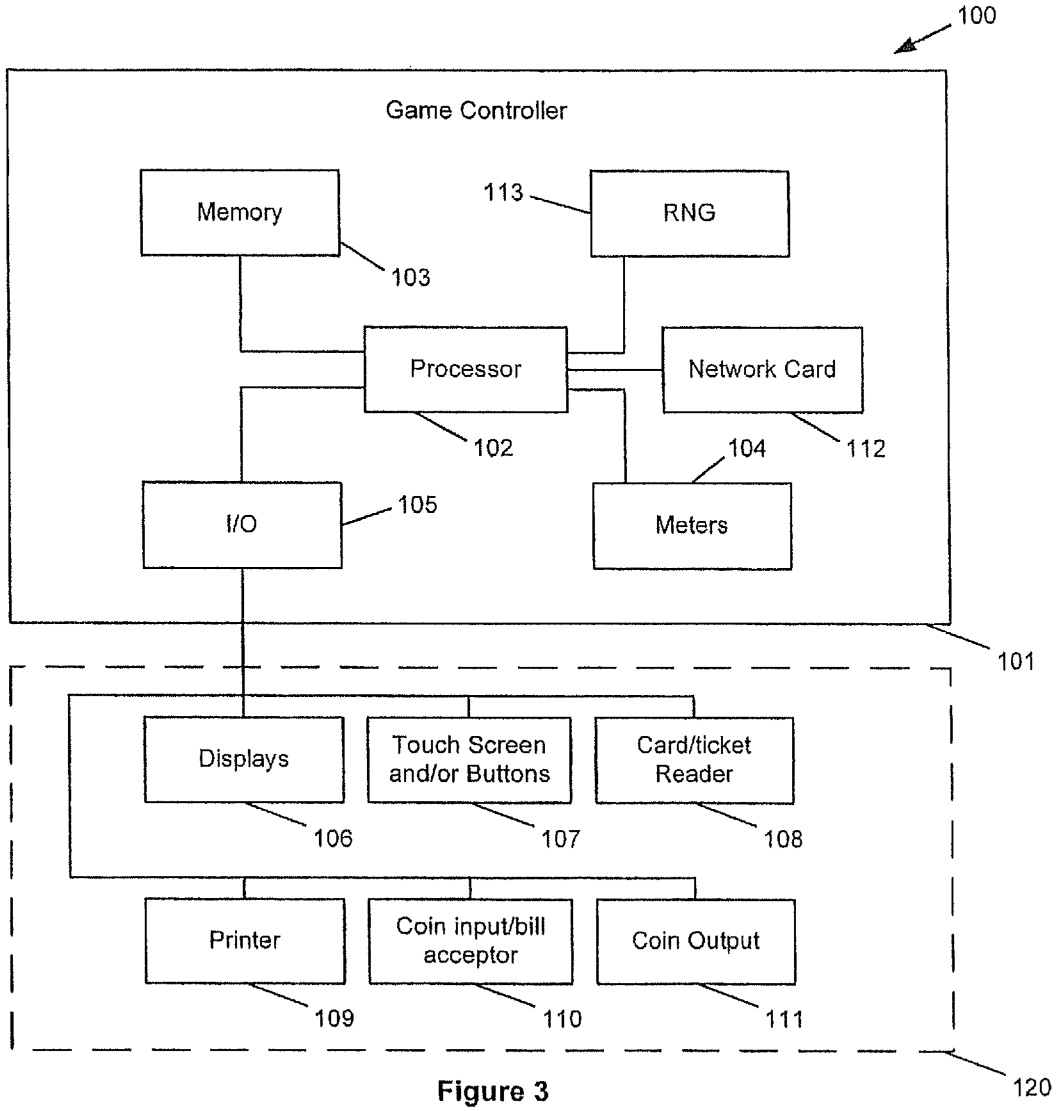
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
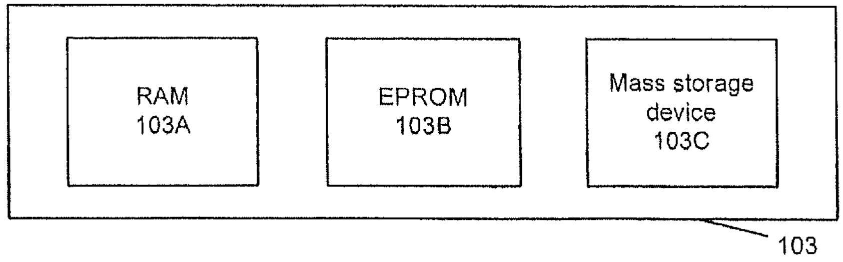
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
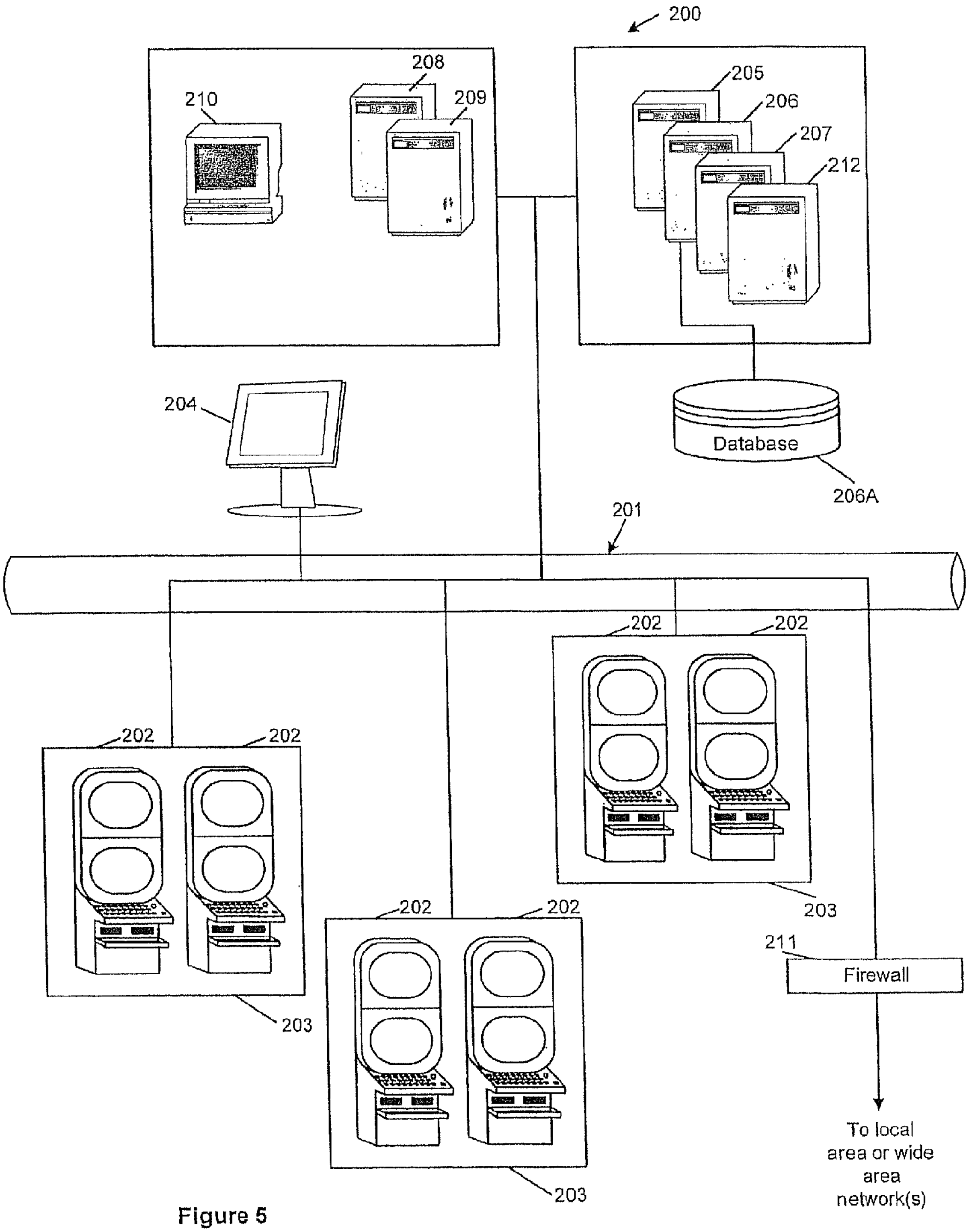
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to place a wager and to specify the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they will play in each game—i.e. a minimum of one line up to the maximum number of lines allowed by the game (noting that not all permutations of win lines may be available for selection. Such win lines are typically formed by a combination of displayed symbol positions, one from each reel, the symbol positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums.

Figure 6:
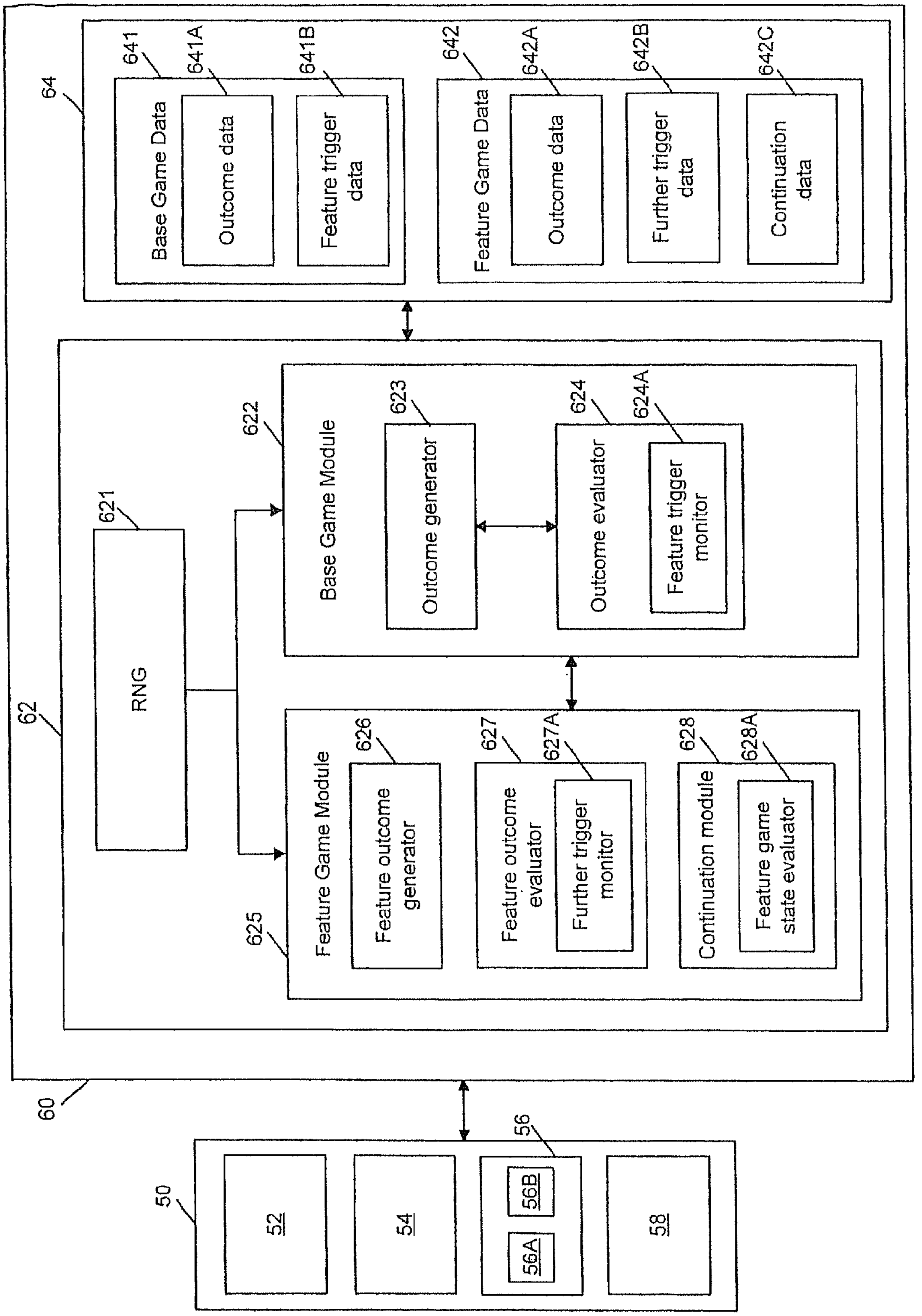
FIG. 6 is a further block diagram of a gaming system.

In FIG. 6, the processor 62 of game controller 60 is shown implementing a number of modules based on program code and data stored in memory 64. Persons skilled in the art will appreciate that various of the modules could be implemented in some other way, for example by a dedicated circuit.

These modules include a base game module 622 having an outcome generator 623 which operates in response to the player's operation of game play mechanism 56 to initiate a play of the game and generate a game outcome based on base game data which will then be evaluated by outcome evaluator 624. On example, of game which can be employed in the embodiment is a spinning reel type game and in such an example generating a game outcome involves selecting symbols of the reels for display on display 54 at a set of display positions.

One example of selecting symbols is to select symbols for display from a plurality of symbol sets specifying a sequence of symbols for each reel such that symbols are selected by selecting a stopping position in the sequence. In one example, three symbols of each of five reels may be displayed such that symbols are displayed at fifteen display positions on display 54. It is known to bias the stopping positions to thereby control the odds of the game. Other techniques can be used to control the odds of particular outcomes occurring to thereby control the return to player of the game.

The outcome evaluator 624 evaluates the displayed symbols based on the player's wager and outcome data 641A (for example, a prize table) to determine whether to make any awards to the player. The outcome evaluator 624 includes a feature trigger monitor for determining whether a trigger condition is met based on feature trigger data 641B. In this embodiment, the trigger condition can be determined from the outcome generated by the outcome generator 623. An example of a trigger is that a designated number (e.g. 3) of a designated symbol appear at scattered display positions. In other embodiments, the trigger monitor may not be a subcomponent of the outcome evaluator because of the nature of the trigger.

When a trigger condition is met, the feature game is triggered and is conducted by the feature game module 625. In the embodiment, the feature game module includes a feature game outcome generator 626 and a feature outcome evaluator 627 to indicate that the feature game may involve generation of different outcomes to the base game and/or be subject to a different evaluation, however persons skilled in the art will appreciate that some feature games, for example, those involving free games, and hence the feature game module 625 need not have its own outcome generator and evaluator but rather can employ those of the base game module 622. Similarly, the feature evaluator 627 is shown including a further trigger evaluator 627A to indicate that the further trigger may be different to the feature trigger, however in an advantageous embodiment, the further and feature triggers are the same such that the further trigger is what is usually referred to as a re-trigger. Feature game module 625 employs feature game data 642 including outcome data 642A and further trigger data 642B in an analogous manner to that described above.

When a further trigger is evaluated as having occurred by the further trigger monitor 627A, the continuation module 628 is activated to determine which of a plurality of continuations stored as continuation data 642C to apply. That is, there will be at least two continuations which can be applied. Put another way, the continuations are different game play options which can be applied.

The continuations which are available will depend on the embodiment. For example in a feature game where the player receives free games and benefits such as special symbols accumulate to the player during play such that if the player accumulates special symbols early in the free game sequence the outcome is generally better, exemplary continuations may include allocating additional free games (e.g. 5 games) or ending the feature and re-starting the free game sequence (which may be 15 games long). Thus, if the player has accumulated a beneficial number of special symbols when the further trigger occurs the additional free game continuation will be more beneficial whereas if the player has not accumulated any special symbols it will be more advantageous to end the feature and re-start. It will be appreciated that there may be more than two continuations to provide for more alternatives. Persons skilled in the art will appreciate that the intention of the continuations is to provide some form of more beneficial outcome to the player, for example, by enhancing or extending game play or providing alternative game play. The continuation need not extend play significantly, for example one game play option may be for a player to apply a multiplier to all wins in a series of game rounds, if the re-trigger occurs in the last game of the series, the extent of the continued play may be for the multiplier to be selected and applied to all previously accrued wins.

The illustrated embodiment shows two examples of how the continuations may be determined. In one example, the continuation module 628 determines which continuation to apply by evaluating the current state of the game with game state evaluator 628A to determine which of the continuations to apply based on an evaluation of whether from the current game state, the player is likely to do better with one continuation than another. For example, if the player is well below the median expected return to this point in the feature game, a continuation involving a re-start is selected as this selection is the most optimal.

In another example, the alternative continuations are presented to the player to make a selection using selection buttons 56A, 56B of game play mechanism 56 and the continuation which is selected is determined by the continuation module 628 as the continuation to apply. In a variant of this example, the game state evaluator 628A may generate data output by the game controller 60 on display 54, the data indicative of which selection would be more favourably to assist the player in making a selection.

Once, the continuation is selected it is applied by the feature game module 625.

The exemplary trigger condition described above is of the type where a number of symbols at scattered positions triggers the feature game. Similar triggers include where the symbols must be on a win line played by the player. Such triggers may include variants which affect the manner in which the feature is carried out, for example where a number of free games is awarded, the number of free games awarded may depend on how many symbols triggered the free game sequence. In an analogous manner, there may be variants on at least one of the continuations which are related to the nature of the trigger. For example, different numbers of free games in one of the continuations.

Rather than trigger conditions being of the type based on game outcomes described above, other triggers known in the art could be employed, for example triggers based on turnover or external triggers from a connected bonus controller.

Persons skilled in the art will appreciate that a feature game involves some additional element of game play which only occurs when a trigger condition is met. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game. The continuations can be designed to fit with the nature of the feature game, for example, in a pick a box type game the player may be given the choice of an extra selection or undoing a previous selection.

It is possible for the feature trigger to be based on a counter visible to the player which increments based on game outcomes or turnover. Accordingly, one continuation may be to increase the counter so that the feature will re-trigger sooner. Other continuations include: adding special symbols to the game such as wild symbols, multipliers, bonus symbols or the like; and applying a modifier to the outcome of the feature game such as a multiplier or fixed amount of credits.

Figure 7:
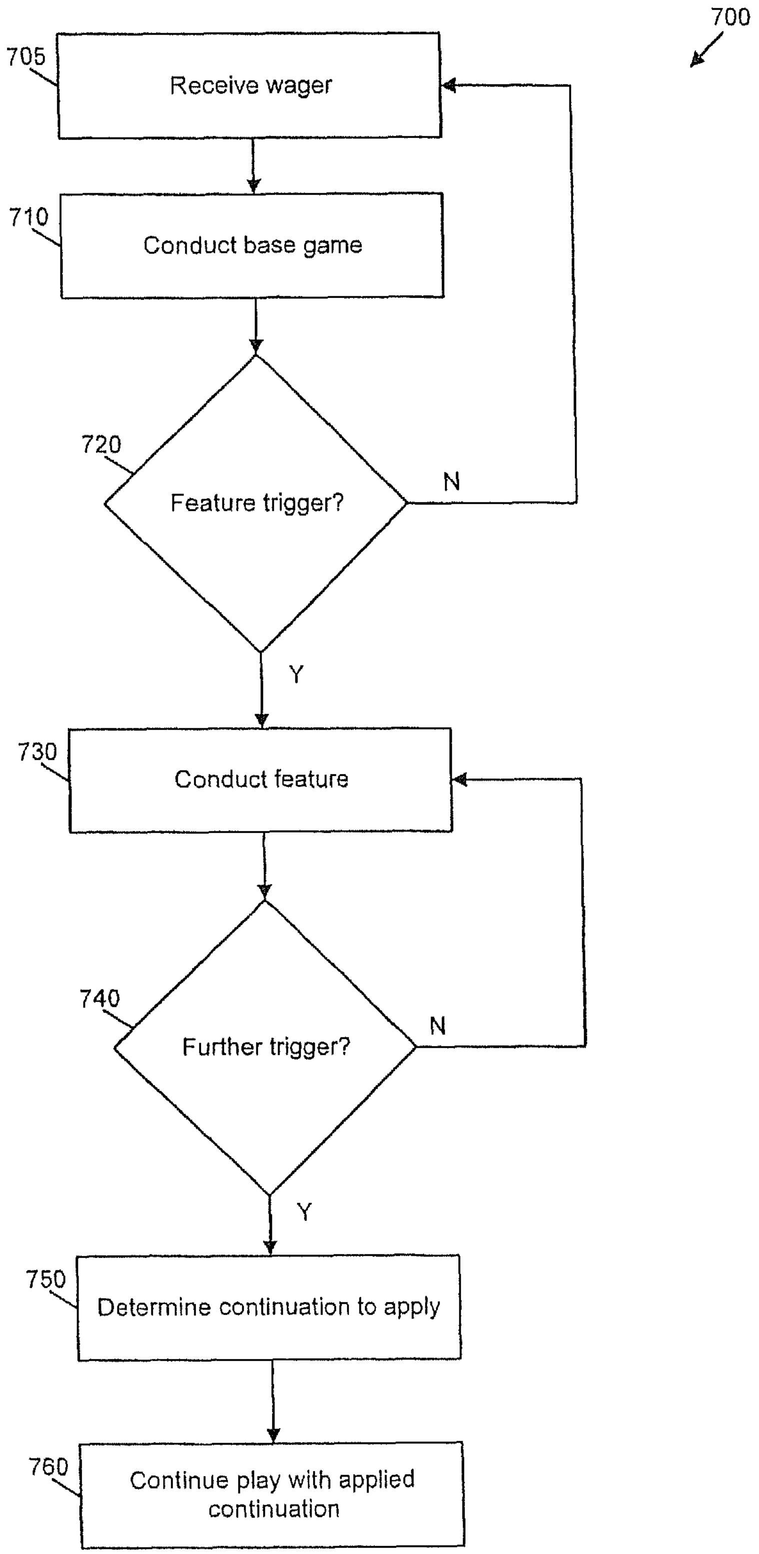
FIG. 7 is a flow chart of an embodiment.

FIG. 7 shows a summary of the method 700 of the embodiment, which involves: initiating play by conducting a base game 710 in response to receipt of a wager 705 and determining 720 whether a feature trigger occurs. If no trigger occurs, the game controller waits to receive 705 a further wager. When a feature trigger occurs, the feature is conducted 730. It is determined 740 at appropriate points in the feature game, whether a further trigger conditions is met. If a further trigger does not occur, conduct 730 of the feature game continues. When a further trigger condition is met, it is determined 750 which continuation to apply and play is continued 760 with the applied continuation.

Further aspects of the method will be apparent from the above description of the gaming system. Persons skilled in the art will also appreciate that the method could be embodied in program code. The program code could be supplied in a number of ways, for example on a tangible computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention, in particular it will be apparent that certain features of embodiments of the invention can be employed to form further embodiments.

For example, there may be eligibility requirements such as are known in the art to be eligible for one or both of the triggers, for example, the player may have to make an ante bet or a maximum bet or play a certain number of play lines or reels.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A game controller for a gaming system operable to play a base game and a feature game, and having a non-transitory memory having data indicative of the base game, the feature game, and a plurality of alternative game play continuations, wherein said plurality of alternative game play continuations provide alternative plays of the feature game, wherein each alternative game play continuation configures the feature game to provide an alternative game play, the game controller comprising:

a base game module configured to initiate play of the base game;

a feature game module configured to conduct the feature game in response to a first trigger condition being met during play of the base game;

a continuation module configured to evaluate a current state of the feature game, and determine which of said alternative game play continuations to access when the second trigger condition is met during play of the feature game including making an optimal selection of one of alternative game play continuations based on the current state of the feature game; and continue play of the feature game to provide the alternative game play based on the determined alternative game play continuation.

2. A game controller as claimed in claim 1, wherein the non-transitory memory further includes data indicative of at least one game rule, and wherein the continuation module is further configured to determine which of said alternative game play continuations to access based further on the at least one game rule.

3. A gaming system operable to play a base game and a feature game, the gaming system comprising:

a non-transitory memory having data indicative of the base game, the feature game, and a plurality of alternative game play continuations, wherein said plurality of alternative game play continuations provide alternative plays of the feature game, wherein each alternative game play continuation configures the feature game to provide an alternative game play;

a display for displaying game play to a player; and a game controller configured to:

initiate play of the base game on the display;

conduct the feature game in response to a first trigger condition being met during play of the base game;

determine if a second trigger condition is met during play of the feature game;

determine which of the alternative game play continuations to access when the second trigger condition is met during play of the feature game, wherein said game controller comprises a continuation module configured to evaluate a current state of the feature game and make an optimal selection of one of alternative game play continuations based on the current state of the feature game; and continue play of the feature game to provide the alternative game play with the determined alternative game play continuation.

* * * * *